United States Patent [19]

Sakagami et al.

[11] Patent Number: 4,644,025

[45] Date of Patent: Feb. 17, 1987

[54] LENS MATERIALS OF HIGH REFRACTIVE INDEXES

[75] Inventors: Teruo Sakagami; Yasufumi Fujii; Naohiro Murayama, all of Iwaki, Japan

[73] Assignee: Kureha Kagaku Kogyo Kabushiki Kaisha, Tokyo, Japan

[21] Appl. No.: 746,567

[22] Filed: Jun. 19, 1985

[30] Foreign Application Priority Data

Jun. 20, 1984 [JP] Japan .................................. 59-125327

[51] Int. Cl.$^4$ ............................................ C08F 214/16
[52] U.S. Cl. ..................................... 526/261; 350/409; 526/291; 526/292.3; 526/292.4; 526/292.5
[58] Field of Search ................... 526/291, 292.3, 292.4, 526/292.5, 296, 261

[56] References Cited

U.S. PATENT DOCUMENTS 2,465,316  3/1949  Mowry et al. .................... 526/292.5
3,128,300  4/1964  Miller et al. ........................ 526/296

Primary Examiner—Harry Wong, Jr.
Attorney, Agent, or Firm—Wenderoth, Lind & Ponack

[57] ABSTRACT

Compositions each comprising a copolymer of a specific allylic or (meth)acrylic compound of an iodine-substituted benzoic acid derivative and a comonomer have a refractive index $n_D^{20}$ of at least 1.58 and an Abbé's number of at least 28 and are excellent starting materials for the production of high quality lenses.

5 Claims, No Drawings

LENS MATERIALS OF HIGH REFRACTIVE INDEXES

BACKGROUND OF THE INVENTION

This invention relates generally to materials for lenses, hereinafter referred to as lens materials, and more particularly, to synthetic resin lens materials having high refractive indexes and low dispersion.

Heretofore, a variety of inorganic glass lenses have been used in optical instruments. In addition to such inorganic glass lenses, synthetic resin lenses have begun to be widely used because of their light weight, good processability, high stability, good dyeability, mass productivity, low cost, and other desirable properties.

Among various physical property requirements for a lens, an extremely important requirement is that the refractive index be high and that the optical dispersion be low. A lens having a high refractive index has the following advantages: lens systems which are important components in optical instruments such as microscopes, cameras and telescopes and lenses of spectacles can be made compact and reduced in weight, and aberration at spherical surfaces or the like can be reduced. On the other hand, low dispersion is extremely important in that chromatic aberration can be reduced.

However, in both cases of inorganic glass lenses and synthetic resin lenses, lenses having high refractive indexes tend to have high dispersion which those having low refractive indexes tend to have low dispersion.

For example, the lens material currently most widely used as synthetic resin lenses for spectacles is a diethylene glycol bis(allyl carbonate) resin (hereinafter referred to as CR-39). While CR-39 has an Abbé's number $\nu$ of 60 (i.e., dispersion is low), the refractive index is extremely low, i.e., $n_D^{20}=1.50$. While polymethyl methacrylate partially used as a lens material also has a high Abbé's number $\nu$ of 60 as in the case of CR-39, the refractive index is low, i.e., $n_D^{20}=1.49 -1.50$ Polystyrene ($n_D^{20}=1.59$, $\nu=29.0$) and polycarbonate ($n_D^{20}=1.59$, $\nu=29.5$) which are said to have relatively high refractive indexes and low dispersions are unsatisfactory with respect to other physical properties required for lens materials. For example, polystyrene lacks surface hardness, solvent resistance and the like, whereas polycarbonate lacks surface hardness and impact resistance. While improved polycarbonates (Japanese Patent Laid-Open Pub. No. 89752/1978) and aromatic polyesters (Japanese Patent Laid-Open Pub. No. 110853/1979) have been proposed as synthetic resin lenses having high refractive indexes and low dispersion, the other physical properties described above are not entirely satisfactory. Polynaphthyl methacrylate ($n_D^{20}=1.64$) and polyvinyl naphthalene ($n_D^{20}=1.68$) having high refractive indexes have a low Abbé's number $\nu$ of 24 and 20, respectively. Thus, all materials are accompanied by various problems.

In recent years, polymers of high refractive indexes containing, as a component, a halogen-substituted aromatic acrylic or methacrylic ester have been proposed (Japanese Patent Laid-Open Pub. No. 7788/1978, Japanese Patent Laid-Open Pub. No. 7789/1978 and Japanese Patent Laid-Open Pub. No. 15118/1980). In these Japanese Patent Laid-Open Publications, however, no mention is made of these copolymers having any Abbé's number, and the halogens used are limited to chlorine and bromine.

In view of the above described state of the art, synthetic resin lenses having a good balance between their refractive indexes and Abbé's numbers have been greatly desired.

SUMMARY OF THE INVENTION

It is an object of the present invention to solve the problems described above. This object has been accomplished in this invention by the provision of lens materials comprising copolymers of allyl and (meth)acrylic compounds of iodine-substituted benzoic acid derivatives.

Throughout this disclosure, quantities expressed in percent or part are by weight.

A lens material having a refractive index $n_D^{20}$ of at least 1.58 and an Abbé's number of at least 28 according to the present invention comprises a copolymer comprising from 20% to 85% of a monomer (I) represented by the following formula (1).

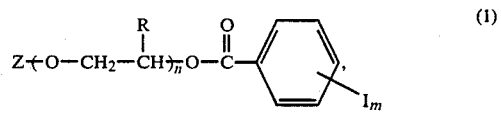

wherein: R represents H or CH$_3$; n is an integer of from 0 to 4; m is an integer of from 1 to 5; and Z represents a CH$_2$=CH—CH$_2$—,

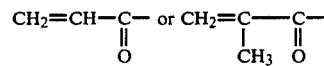

group, and from 15% to 80% of a monomer (II) copolymerizable therewith.

The lens material according to the present invention comprises a copolymer containing an allylic or (meth)acrylic compound of an iodine-substituted benzoic acid derivative. Therefore it is a lens material having an extremely good balance of a high refractive index of at least 1.58, an Abbé's number $\nu$ of at least 28 (low dispersion), and excellent colorless property and transparency. The provision of lens materials according to the present invention solves the problems of the prior art lens materials described above. By (meth)acrylic compound as used herein is meant a methacrylic compound or an acrylic compound.

It is believed that the excellent properties of the lens materials of this invention are attributable to the fact that the copolymer comprises the monomer (I).

DETAILED DESCRIPTION OF THE INVENTION

Copolymer

Monomer (I)

A copolymer constituting a synthetic resin lens material according to the present invention comprises specific comonomer components.

An important component of a copolymer constituting a synthetic resin lens material of the present invention is an iodine-containing monomer (I) represented by the following formula (1).

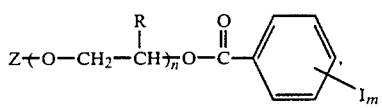

wherein: R represents H or CH$_3$; n is an integer from 0 to 4; m is an integer from 1 to 5; and Z represents a CH$_2$=CH—CH$_2$—,

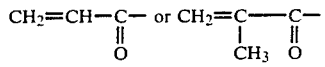

group.

The presence of an iodine-substituent in the compound is extremely important and essential in order to obtain a high refractive index and a high Abbé's number. This means that a higher refractive index is obtained by increasing the value of m. The value of m is selected in the range of from 1 through 5 depending upon the refractive index desired.

The presence of a

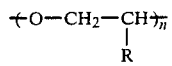

group in the monomer (I) is preferred because such a group provides the lens material of the present invention with improvement of grindability and improvement of Abbé's number. If the value of n is too large, then the effect of iodine presence is reduced, and therefore n is an integer of from 0 to 4 in the present invention. The monomer (I) may also be a mixture of those having different values of n.

Z is a functional group having radical polymerizability, and represents a CH$_2$=CH—CH$_2$-,

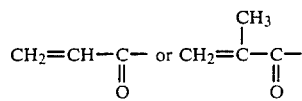

group. When the other monomer which copolyerizes with the monomer (I) has an allyl group, a monomer (I) having an allyl group is preferably used. When the other monomer which copolymerizes with the monomer (I) has a methacrylic or acrylic group, a monomer (I) having a methacrylic or acrylic group is preferably used.

Specific examples of such monomers (I) are allyl 2,4,6-triiodobenzoate, allyl ortho-iodobenzoate, allyl para-iodobenzoate, allyloxyethyl 2,4,6-triiodobenzoate, methacryloxyethyl 2,4,6-triiodobenzoate, methacryloxyethyl ortho-iodobenzoate, acryloxyethyl para-iodobenzoate, and methacryloxyethoxyethyl ortho-iodobenzoate. Of course, these compounds are a few examples of the monomer (I), and the present invention is not limited thereto.

While the use of such a monomer (I) in the lens material of the present invention, even in a small quantity, is effective for obtaining a high refractive index and a high Abbé's number, in order that the lens materials of the present invention have even better properties, it is preferable that the copolymers comprise from 20% to 85%, preferably from 40% to 70% of the monomer (I). We have found that, if the amount of the monomer (I) is more than 85%, the copolymer will have a high refractive index, but it will tend to become brittle. Thus, up to 85% of the monomer (I) is used in the present invention. The percent by weight of the monomer (I) is based on the total weight of the monomer (I) and the comonomer (II) which is described in detail below.

Comonomer (II)

Copolymers obtained by copolymerizing from 20 to 85% of the monomer (I) and at least one monomer copolymerizable therewith have a high refractive index and a low dispersion, as described above, and can be used as a useful synthetic resin lens material.

Many monomers can be used as the comonomer (II) copolymerizable with the monomer (I). When such comonomers are copolymerized with the monomer (I), they must not impair the properties of high refractive index and low dispersion derived from the monomer (I). In other words, it is necessary to select such comonomers so that copolymers having a refractive index $n_D^{20}$ of at least 1.58 and a low dispersion (an Abbé's number of at least 28) are obtained.

Monoethylenically unsaturated and multiethylenically (such as di- or tri-ethylenically) unsaturated compounds copolymerizable with the monomer (I) are preferably used as the mcnomers (II). Because the multiethylenically unsaturated compounds can provide cross-linked copolymers to improve the surface hardness and solvent resistance, it is preferable that at least one multiethylenically unsaturated compound be used as the comonomer.

Examples of these monomers (II) are (a) various acrylic or methacrylic esters such as esters of a monohydric or polyhydric alcohol and acrylic acid or methacrylic acid, for example, 2,2-bis(4-methacryloxyethoxy-3,5-dibromophenyl)propane, ethylene glycol dimethacrylate and 2,4,6-tribromophenyl methacrylate; (b) aromatic vinyl compounds such as styrene, divinylbenzene, and vinyltoluene; and (c) various allyl compounds such as diallylphthalate and diethylene glycol bis(allyl carbonate). For improvement of the surface hardness and solvent resistance of the copolymer, particularly preferred are trifunctional monomers having a triazine ring structure which are represented by the following formula (2) or (3).

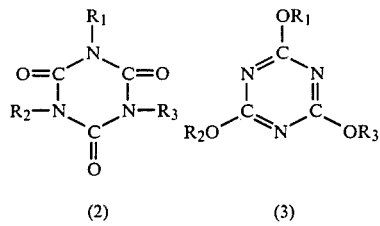

wherein R$_1$, R$_2$ and R$_3$ are the same or different groups selected from —CH$_2$—CH=CH$_2$, —CH$_2$—C≡CH and

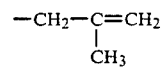

with the proviso that at least one of them is a different group from the others.

Representative examples of the monomers having the triazine ring structure described above are triallyl isocyanurate, triallyl cyanurate, and diallyl propargyl cyanurate.

The amount of these comonomers (II) can suitably be in the range of from 15% to 80%, preferably from 30% to 60% depending upon the properties expected for the resulting copolymers and their intended uses.

Polymerization

The polymerization of the above monomers (I) and (II) proceeds in the presence of a conventional radical polymerization initiator. The polymerization process can be any of those conventionally used in the conventional radical polymerization. However, a cast polymerization process is generally preferable in the present invention from the standpoint of utilization of the resulting copolymer for plastic lenses.

The cast polymerization process is well-known in the art. Plate-shaped, lens-shaped, cylindrical, prism-shaped, pyramidal, spherical, use-dependently designed molds, cells, or the like can be used as a cast polymerization vessel. The material from which the vessel is produced can be any suitable material. Examples of these materials are inorganic glasses, plastics, and metals. The polymerization can be carried out by heating a mixture of monomers and a polymerization initiator charged into such a vessel.

Alternatively, the polymerization can be carried out by another mode of practice wherein a prepolymer or syrup obtained by carrying out polymerization to some extent in a separate vessel is charged into a polymerization vessel, and the polymerization is allowed to progress to completion. The required monomers and polymerization initiators may be mixed all at once or may be mixed stepwise. This mixture may also contain adjuvants such as antistatic agents, coloring agents, fillers, ultraviolet absorbers, heat stabilizers, and antioxidants depending upon the uses expected for the resulting copolymers.

The resulting copolymers can be subjected to post-treatment. For example, the resulting copolymers can be heated in order to promote the polymerization, which can be incomplete, to completion or to increase the hardness. Alternatively, the resulting copolymers can be subjected to annealing in order to remove any residual strain arising in the cast polymerization.

Lens

Lenses according to the present invention are essentially the same as the synthetic resin lenses of the prior art except that the lens material is a specific copolymer. Accordingly, lenses having characteristics inherent to the copolymer of the present invention can be obtained by directly producing lenses from the present copolymer by a cast polymerization process, or by machining plate materials and the like, and then carrying out post-treatments such as surface grinding, antistatic treatment and non-reflective coating, as needed.

Further, in order to increase the surface hardness, it is also possible to coat the surface with an inorganic material by vapor deposition or the like, or to coat the surface with an organic coating composition by dipping or like process.

The following non-limiting examples indicate more fully the nature and utility of the present invention.

EXAMPLE 1 (1) Synthesis of Allyl Ortho-iodobenzoate

Ortho-iodobenzoic acid was reacted with excess thionyl chloride for 3 hours at reflux, and thionyl chloride was distilled off under reduced pressure to obtain ortho-iodobenzoic acid chloride. This was reacted with allyl alcohol in a dichloromethane solvent in the presence of a triethyl amine catalyst to obtain allyl ortho-iodobenzoate. The yield after purification by distillation or like process was repeated was 73%.

(2) Polymerization 1.0 part of lauroyl peroxide was added to 50 parts of the synthesized and purified allyl orthoiodobenzoate and 50 parts of 2,2-bis(4-methacryloxyethoxy-3,5-dibromophenyl)propane, With these materials bulk polymerization was carried out for 15 hours at a temperature of 60° C., for one hour at a temperature of 80° C., for one hour at a temperature of 100° C., and for one hour at a temperature of 110° C.

The resulting copolymer was colorless, transparent and beautiful. The refractive index and Abbé's number of the copolymer were as follows.

Refractive index $n_D^{20} = 1.620$.

Abbé's number $\nu = 29.8$.

Thus, the copolymer of Example 1 was a useful lens material in which is combined a high refractive index and a low dispersion.

EXAMPLE 2

Thirty five parts of triallyl isocyanurate was added to 65 parts of the allyl ortho-iodobenzoate obtained in Example 1. Three parts of benzoyl peroxide was added to the mixture. With these materials bulk polymerization was carried out for 15 hours at a temperature of 60° C., for one hour at 80° C., for one hour at 100° C., and for one hour at 110° C. The resulting copolymer was colorless, transparent and beautiful. The refractive index and Abbé's number of the copolymer were as follows.

Refractive index $n_D = 1.601$.

Abbé's number $\nu = 30.7$.

Thus, the present copolymer of Example 2 provides an optical material having a high refractive index and a high Abbé's number (good balance).

EXAMPLE 3

Methacryloxyethyl ortho-iodobenzoate was obtained from methyl ortho-iodobenzoate and hydroxyethyl methacrylate.

Seventy parts of methacryloxyethyl orthoiodobenzoate, 15 parts of styrene and 15 parts of triallyl isocyanurate were mixed, and 1.0 part of lauroyl peroxide was added to the mixture. Bulk polymerization was carried out with these materials for 15 hours at a temperature of 60° C., for one hour at 80° C, for one hour at 100° C., and for one hour at 110° C. The resulting copolymer was transparent and beautiful. The refractive index and Abbé's number of the resulting copolymer were as follows.

Refractive index $n_D^{20} = 1.60$.

Abbé's number $\nu = 32.6$.

Thus, the copolymer of Example 3 is also a useful lens material having a high refractive index and a high Abbé's number.

What is claimed is:

1. A highly refractive lens material having a refractive index $n_D^{20}$ of at least 1.58 and an Abbé's number of at least 28, said lens material being a copolymer comprising from 20% to 85% by weight of a monomer (I) represented by the following formula (1)

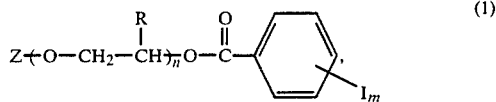

wherein: R represents H or $CH_3$; n is an integer of from 0 to 4; m is an integer of from 1 to 5; and Z represents a $CH_2=CH-CH_2-$,

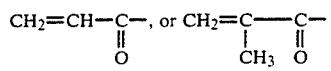

group, and from 15 to 80% by weight of a monomer (II) copolymerizable with the monomer (I), said monomer (II) comprising a monomer selected from the group consisting of (a) esters of a monohydric or polyhydric alcohol and acrylic acid or methacrylic acid, (b) styrene, divinylbenzene, or vinyltoluene (c) diallyl phthalate or diethylene glycol bis (allyl carbonate), and (d) triallyl cyanurate or triallyl isocyanurate.

2. The lens material as claimed in claim 1 in which the copolymer comprises 40 to 70% by weight of the monomer (I) and 60 to 30% by weight of the comonomer (II).

3. The lens material as claimed in claim 1 in which the Z is a $CH_2=CH-CH_2-$ group.

4. The lens material as claimed in claim 1 in which the Z is a

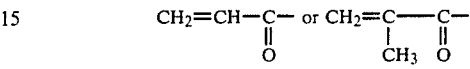

group.

5. The lens material as claimed in claim 1 in which the multiethylenically unsaturated compound is triallyl cyanurate or triallyl isocyanurate.

* * * * *